United States Patent [19]

Wolf

[11] 4,184,825
[45] Jan. 22, 1980

[54] APPARATUS FOR VACUUM TREATMENT OF CHEESE

[75] Inventor: Raymond M. Wolf, Rockville, Minn.

[73] Assignee: Kraft, Inc., Glenview, Ill.

[21] Appl. No.: 890,526

[22] Filed: Mar. 27, 1978

[51] Int. Cl.² ............... A01J 25/11; A01J 25/15
[52] U.S. Cl. ........................................ 425/85; 99/458; 99/465; 100/90; 100/116; 100/295; 425/405 R; 425/416; 425/420
[58] Field of Search ............... 425/84, 85, 405 R, 416, 425/420, 504; 426/582; 100/90, 110, 116, 295; 99/456, 458, 459, 460, 472, 465; 210/77, 359, 416 R

[56] References Cited

U.S. PATENT DOCUMENTS

| 929,384 | 7/1909 | Brown et al. ................. 100/124 |
| 1,699,873 | 1/1929 | Brodsky ....................... 210/359 |
| 2,109,559 | 3/1938 | Wickert ........................ 100/125 |
| 2,139,542 | 12/1938 | Finlayson et al. ............ 100/44 |
| 2,714,349 | 8/1955 | Johnston ...................... 100/106 |
| 2,742,367 | 4/1956 | Bachert ........................ 99/472 |
| 2,959,900 | 11/1960 | Wollett ......................... 100/90 |
| 3,234,598 | 2/1966 | Quinn .......................... 425/85 |
| 3,317,999 | 5/1967 | Royer et al. .................. 425/84 |
| 3,355,805 | 12/1967 | Krueger et al. ............... 425/84 |
| 3,530,551 | 9/1970 | Haes et al. ................... 425/85 |
| 3,748,072 | 7/1973 | Whelan ....................... 425/405 R |

FOREIGN PATENT DOCUMENTS

| 21615 | 2/1935 | Australia ..................... 210/359 |
| 62995 | 6/1891 | Fed. Rep. of Germany ........... 210/359 |
| 1399728 | 4/1965 | France ......................... 425/84 |

Primary Examiner—W. E. Hoag
Attorney, Agent, or Firm—Fitch, Even & Tabin

[57] ABSTRACT

An apparatus for pressing and vacuum treating cheese curd to provide a cheese block wherein the receptacle for the curd is used as part of the vacuum chamber. The apparatus includes a simple attachment for a curd receptacle whereby the curd within the receptacle can be pressed while at the same time the curd is deaerated with vacuum.

4 Claims, 6 Drawing Figures

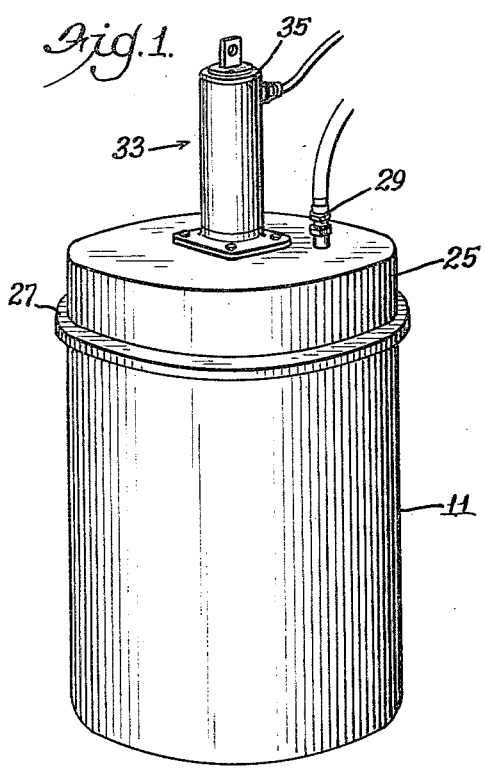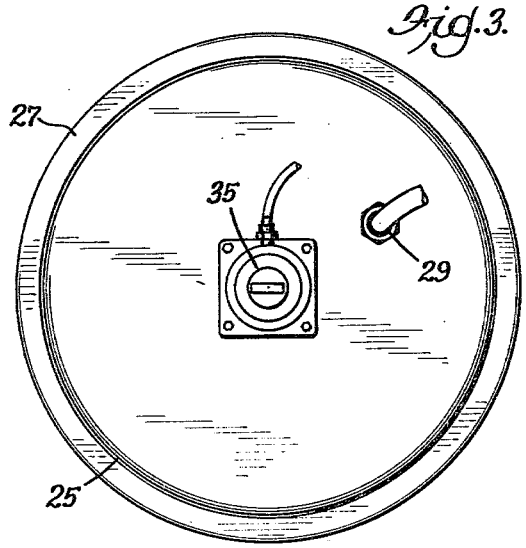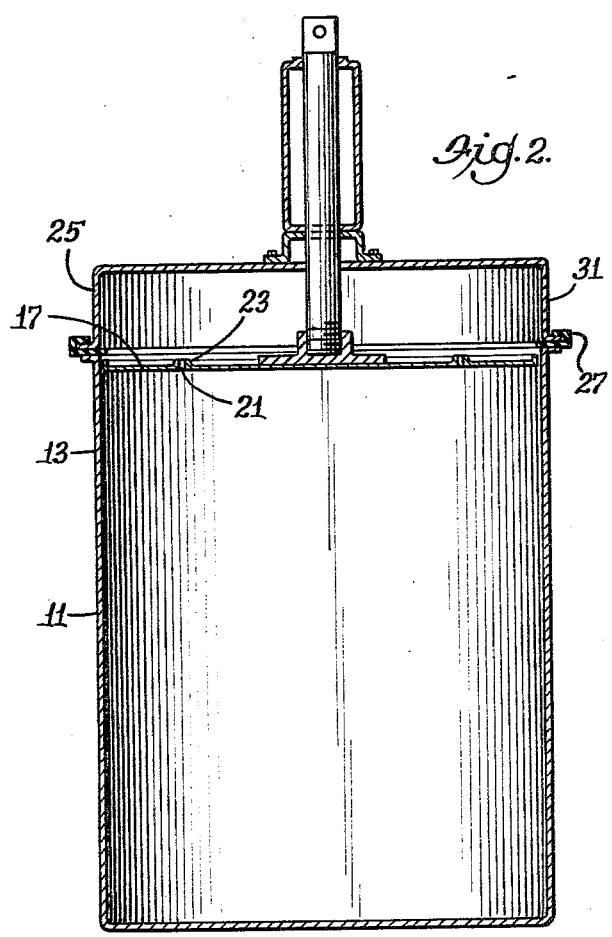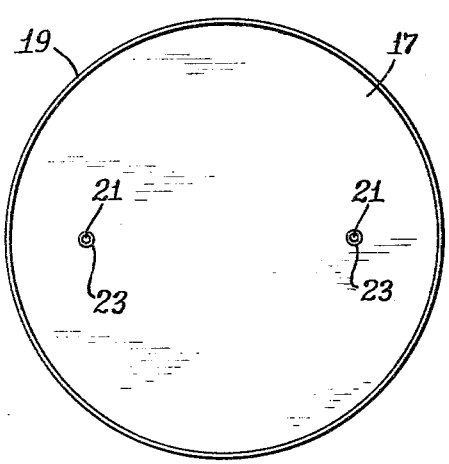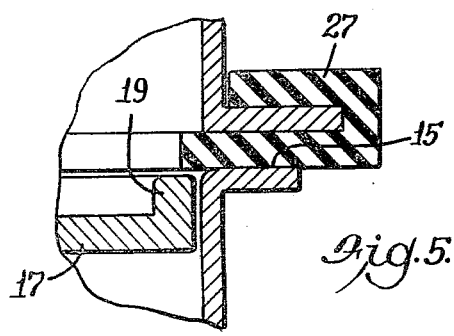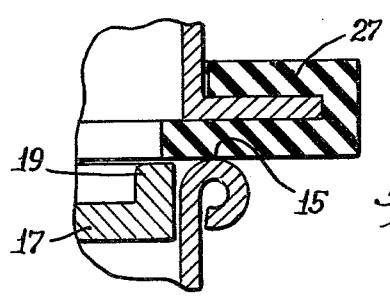

APPARATUS FOR VACUUM TREATMENT OF CHEESE

The present invention relates generally to a method and apparatus for the manufacture of large blocks of cheese from curd which has been separated from whey. More particularly, the method and apparatus of the invention is used to press and deaerate curd pieces in a mold while removing residual moisture from the curd and thereafter curing the curd while it remains in the mold to provide a large block of cured cheese.

Various methods and apparatus are well known for pressing and vacuum treatment of curd to provide cheese blocks. In general, such vacuum treatment of cheese curd has involved placing a container of cheese curd within a vacuum chamber and subsequent application of vacuum within the chamber is used to deaerate the curd. The curd can be pressed before placing the container in the chamber or during the vacuum treatment in the chamber. The establishment of a large chamber for receiving the container of curd, however, has resulted in large capital costs for massive equipment used for providing the vacuum chamber for treatment of the curd. It would be desirable to provide apparatus and a method for vacuum treatment and pressing of cheese curd wherein the receptacle for the curd forms part of the vacuum chamber and wherein the vacuum treatment and pressing of the curd is effected by use of a simple attachment for the receptacle.

Accordingly, it is a principal object of the present invention to provide a method and apparatus for pressing and vacuum treating curd to provide cheese wherein the receptacle for the curd is used as part of the vacuum chamber. It is another object of the present invention to provide a simple attachment for a curd receptacle whereby the curd within the receptacle can be pressed while at the same time the curd is deaerated with vacuum.

These and other objects will become more apparent from the following detailed description and the accompanying drawings, wherein:

FIG. 1 is a perspective view of the apparatus of the invention.

FIG. 2 is a cross-sectional view of the apparatus of FIG. 1 taken along a center line of the apparatus.

FIG. 3 is a top view of the apparatus of FIG. 1.

FIG. 4 is a top view of the press plate shown in FIG. 2.

FIG. 5 is an expanded view showing the junction of the receptacle and the cover, and FIG. 6 is a further embodiment showing the junction of the cover and the receptacle.

The apparatus of the present invention for molding curd into a cheese block prior to curing, comprises a rigid open-topped receptacle 11 for receiving a mass of curd. The receptacle has substantially vertical side walls 13 adjacent the open top to define a vertical pressing zone. The upper end of the vertical side walls are flanged to provide an upper bearing surface 15. A press plate 17 for insertion into the open top of the receptacle after the receptacle has received a mass of curd has a shape substantially corresponding to the shape of the open top of the receptacle. The press plate is free to float on the top of the mass of curd and is free to be pressed onto the mass of curd in the vertical pressing zone. The press plate has an upturned flange 19 at the periphery of the press plate to define a fluid reservoir on the upper surface of the press plate. The press plate contains at least one orifice 21 through the press plate. The orifice, or each orifice if more than one, has upstanding side walls 23, which in combination with the upturned flange of the press plate, define the reservoir. As the press plate is pressed against the curd, fluid whey emerges through the orifice annd is collected in the reservoir.

A rigid cover 25 is provided for the receptacle. The cover has a shape substantially corresponding to the shape of the open top of the receptacle and the cover extends outwardly over the bearing surface of the receptacle. At least the periphery of the cover has a resilient material 27 affixed thereto for engagement with the upper bearing surface 15 of the receptacle. A vacuum duct 29 is connected to the cover. Vacuum means (not shown) communicates with the space between the cover and the press plate by vacuum duct 29 whereby vacuum is established in the space between the cover and the press plate. Application of vacuum causes the cover to become engaged with the receptacle by compression of the resilient material by means of the reduction in pressure. The resilient material bears against the upper bearing surface 15 of the receptacle and a tight fit is attained between the cover and the receptacle without resort to any latching means.

After vacuum is applied to the space between the cover and the receptacle, pressure means 33 is used to force the press plate 17 against the surface of the curd whereby residual whey is forced from the curd through the orifice 21 and over the side walls 23 of the orifice into the reservoir created by the upturned flange 19 and the side walls 23 of the orifice 21 of the press plate 17. For a curd mass of about 500 pounds, the total amount of whey recovered from the curd in the reservoir is about 1.5 gallons. The whey can be permitted to remain in the reservoir until the vacuum is disconnected. At this time, the rigid cover 25 is removed from the receptacle, the press plate is removed from the surface of the curd and the whey is discharged from the reservoir. Alternatively, pump means can be used to remove the whey from the reservoir during the vacuum cycle.

The receptacle 11 is preferably constructed from stainless steel or other easily cleanable rigid material. As shown in FIG. 1, the receptacle is preferably cylindrical for ease of construction and removal of the curd after the curing cycle. However, the apparatus of the invention is flexible in that other sizes and shapes of cheese block can be prepared. For example, the receptacle 11 can be rectangular in shape to provide a rectangular cheese block.

The press plate 17 fits into the open end of the receptacle 11. The receptacle 11 has substantially vertical side walls at least adjacent to the open top to define a vertical pressing zone. The extent of travel of the press plate 17 during the pressing cycle is limited and the requirement for substantially vertical side walls extends only for a few inches below the open top, at most about 12 inches. Moreover, to accommodate less than a total charge of curd in the receptacle, it is preferred that the entire extent of the side walls of the receptacle 11 from the bottom of the receptacle to the open top be straight and vertical. This permits the press plate 17 to travel thruout the length of the receptacle to accommodate any size charge of curd. Of course, by the term "vertical" is meant the usual orientation for loading and working with an open-topped receptacle. After application of vacuum or other means to cause the rigid cover to close the receptacle, the apparatus could be used in a horizontal position.

To prevent curd from being extruded between the outer edge of the press plate 17 and the inner walls of the receptacle 11, it is preferred that the press plate 17 be of a size such that no more than about ¼ inches clearance is provided between the outer edge of the press plate 17 and the inner wall of the receptacle 11. The upturned flange 19 at the periphery of the press plate and the side walls 23 of the orifice 21 extend upwardly sufficiently to provide a reservoir having a capacity of from about 1 to about 10 gallons for each 500 pounds of curd.

As shown in FIG. 5, the vertical side walls of the receptacle 11 are bent outwardly to form a flange. The upper surface of the flange provides the upper bearing surface 15. As shown in FIG. 6, the vertical side walls are rolled over to provide a round upper bearing surface 15. The round surface of FIG. 6, is sometimes preferred to form a smaller contact area between the upper bearing surface 15 and the resilient material affixed to the rigid cover 25.

As shown in FIG. 2, the rigid cover 25 has downwardly depending side walls 31. The downwardly depending side walls 31 form a space between the top of the rigid cover 25 and the upper extent of the receptacle 11. This permits maximum utilization of the total volume of receptacle 11 and permits filling curd to the uppermost extent of receptacle 11 and still provide room for placing the press plate 17 in position on top of the curd. If the entire volume of the receptacle 11 is not used, however, there is no need for having depending side walls and rigid cover 25 can be a single planar piece.

Pressure means 33 is shown in FIG. 2. Pressure means 33 can be an air cylinder 35, as shown in FIG. 2, or other mechanical means can be used to provide pressure to pressure plate 17. To facilitate removal of press plate 17 and discharge of whey from the reservoir, it is preferred that the pressure means 31 is not affixed to pressure plate 17. Press plate 17 can be affixed to pressure means 31, however, if this is considered desirable.

In operation, curd received from a whey/curd separation process in a cheese making operation is loaded into receptacle 11. The press plate 17 is placed in position on top of the curd. The rigid cover 25 is placed in position on top of the receptacle so that the resilient material of the rigid cover is in position over the upper bearing surface 15 of receptacle 11. Vacuum is established in the space between the cover and the press plate. This causes the cover to adhere tightly to the receptacle and to create an airtight seal between the cover and the receptacle. As the vacuum is maintained in the space between the cover and the press plate, pressure is applied to the press plate so as to express whey from the curd through the orifice 21. The whey collects on top of press plate 17 in the reservoir created by the upturned flange 19 and the side walls 23 of the orifice 21. After the vacuum treatment is finished, the vacuum is terminated. The cover can then be removed from the receptacle to expose the press plate with the collected whey. The press plate is removed and the whey is discharged.

In general, vacuum is used at a level of about 15 to about 24 inches of Hg vacuum for a minimum period of from about 45 minutes. There is no limit to the period that the vacuum may be applied, however, no substantial benefits are obtained after a period of about 5 hours. The pressure applied to press plate 17 is from about 1 to about 4 psig and is applied for a minimum period of about 45 minutes during the vacuum cycle. As in the case of the vacuum application, there is no limit to the period that the pressure on the press plate may be applied, however, no substantial benefits are obtained after a period of about 5 hours.

After removal of the cover and press plate, the curd in receptacle 11 can be moved to a suitable curing room. In this connection, it is generally desirable to line receptacle 11 with a plastic container to receive the curd. This aids in ultimate removal of the cheese block from the container. Any excess of the plastic container at the top can be positioned in the space between the cover and the press plate during the vacuum treatment step. The excess of the plastic container is then folded over the curd during the curing step to seal the curd from the atmosphere during curing. After the cheese block is cured, the cheese block can then be readily removed from the receptacle and cut into desired shapes.

The apparatus of the present invention provides a simple and flexible means for vacuum treatment and pressing of the curd to remove residual whey and any gas contained in the curd after the curd is packed into the receptacle and the receptacle can then be used as a curing container. The apparatus of the present invention provides a method for vacuum treatment and pressing of curd without using large vacuum chambers and provides economic and simple apparatus for such treatment.

What is claimed is:

1. Apparatus for molding curd into a cheese block prior to curing comprising a rigid open-topped receptacle for receiving a mass of curd, said receptacle having substantially straight side walls adjacent said open top to define a pressing zone, the upper end of said side walls being flanged to provide an upper bearing surface, a press plate for insertion into said open top after said receptacle has received a mass of curd, said press plate having a shape substantially corresponding to the shape of said open top and said press plate being free to float on the top of the mass of curd, said press plate having an upturned flange at the periphery of said plate to define a fluid reservoir on the upper surface of said plate and at least one orifice through said plate, said orifice having upstanding side walls, a rigid cover for said receptacle, said cover having a shape substantially corresponding to the shape of said open top and extending outwardly over said bearing surface of said receptacle, at least the periphery of said cover having a resilient material affixed thereto for engagement with said upper bearing surface of said receptacle, vacuum means communicating with the space between said cover and said plate whereby vacuum is established in said space, said vacuum causing said cover to be engaged with said receptacle whereby said resilient material is compressed against said bearing surface to establish an airtight seal and pressure means to force said press plate against the surface of said curd whereby residual whey is forced from said curd through said orifice in said press plate to collect in the reservoir on the surface of said press plate.

2. Apparatus in accordance with claim 1 wherein said upper end of said side walls are rolled over to provide a rounded upper bearing surface.

3. Apparatus in accordance with claim 1 wherein said upper end of said side walls are oriented at a right angle to said side walls to provide a flat upper bearing surface.

4. Apparatus in accordance with claim 1 wherein means are provided to remove said whey from said reservoir while vacuum is being applied.

* * * * *